(12) United States Patent
Schedivy

(10) Patent No.: US 7,245,274 B2
(45) Date of Patent: *Jul. 17, 2007

(54) HEADREST MOUNTABLE VIDEO SYSTEM

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 398 days.

This patent is subject to a terminal disclaimer.

(21) Appl. No.: 10/438,724

(22) Filed: May 15, 2003

(65) Prior Publication Data

US 2004/0227695 A1 Nov. 18, 2004

(51) Int. Cl.
*G09G 5/00* (2006.01)
(52) U.S. Cl. .......................................... 345/7; 345/905
(58) Field of Classification Search .............. 296/24.1, 296/37.8; 340/691.1, 461, 435; 224/275, 224/929, 572; 439/131; 361/681, 683, 837–838; 386/46; 345/7, 905; 348/837, 838; 349/58, 349/149–152; 297/188.04, 188.05, 217.3, 297/217.4, 217.1; 248/226.11, 228.8, 205.2; 725/75

See application file for complete search history.

(56) References Cited

U.S. PATENT DOCUMENTS

| | | | |
|---|---|---|---|
| 4,681,366 A | 7/1987 | Lobanoff | 297/191 |
| 4,702,519 A | 10/1987 | Lobanoff | |
| 4,756,528 A | 7/1988 | Umashankar | 273/1 |
| 4,843,477 A | 6/1989 | Mizutani et al. | 358/248 |
| 4,982,996 A | 1/1991 | Vottero-Fin et al. | 297/217.3 |
| 5,214,514 A | 5/1993 | Haberkern | |
| 5,255,214 A | 10/1993 | Ma | 361/680 |
| 5,396,340 A | 3/1995 | Ishii et al. | |
| 5,410,447 A | 4/1995 | Miyagawa et al. | 361/681 |
| 5,555,466 A | 9/1996 | Scribner et al. | 348/8 |
| 5,949,345 A | 9/1999 | Beckert et al. | 340/815.41 |

(Continued)

FOREIGN PATENT DOCUMENTS

FR 2817812 6/2002

(Continued)

*Primary Examiner*—Nitin I. Patel
(74) *Attorney, Agent, or Firm*—F. Chau & Associates, LLC

(57) ABSTRACT

A video system comprises a base unit coupled to an internal headrest support structure, wherein the base unit comprises a media player, and a display mounted in a door pivotally connected to the base unit by a hinge and in a closed position concealing the media player.

23 Claims, 16 Drawing Sheets

U.S. PATENT DOCUMENTS

| | | | |
|---|---|---|---|
| 6,081,420 A | 6/2000 | Kim et al. | 261/681 |
| 6,102,476 A | 8/2000 | May et al. | 297/217.3 |
| D438,853 S | 3/2001 | Iino | D14/136 |
| 6,216,927 B1* | 4/2001 | Meritt | 224/275 |
| 6,266,236 B1 | 7/2001 | Ku et al. | 361/681 |
| 6,292,236 B1 | 9/2001 | Rosen | 348/837 |
| 6,339,455 B1 | 1/2002 | Allan et al. | |
| 6,409,242 B1 | 6/2002 | Chang | 296/37.7 |
| 6,669,285 B1 | 12/2003 | Park et al. | 297/217.3 |
| 6,719,343 B2* | 4/2004 | Emerling et al. | 296/24.34 |
| 6,724,317 B1* | 4/2004 | Kitano et al. | 340/691.1 |
| 6,871,356 B2 | 3/2005 | Chang | 725/75 |
| 6,899,365 B2* | 5/2005 | Lavelle et al. | 296/37.15 |
| D515,522 S * | 2/2006 | Vitito | D14/126 |
| 7,044,546 B2* | 5/2006 | Chang | 297/217.3 |
| 2001/0001083 A1* | 5/2001 | Helot | 439/131 |
| 2002/0186531 A1* | 12/2002 | Pokharna et al. | 361/687 |
| 2003/0021086 A1* | 1/2003 | Landry et al. | 361/683 |
| 2003/0137584 A1* | 7/2003 | Norvell et al. | 348/61 |
| 2003/0184137 A1 | 10/2003 | Jost | 297/219.1 |
| 2003/0198008 A1* | 10/2003 | Leapman et al. | 261/681 |
| 2004/0130616 A1 | 7/2004 | Tseng | |
| 2004/0227696 A1* | 11/2004 | Schedivy | 345/7 |
| 2006/0112144 A1 | 5/2006 | Ireton | |

FOREIGN PATENT DOCUMENTS

| | | |
|---|---|---|
| FR | 2 829 980 | 3/2003 |
| JP | 2001-047921 | 2/2001 |
| WO | WO 00/38951 | 7/2000 |
| WO | WO 02/074577 A1 | 9/2002 |
| WO | WO 03/029050 A1 | 4/2003 |

* cited by examiner

HEADREST MOUNTABLE VIDEO SYSTEM

BACKGROUND OF THE INVENTION

1. Field of the Invention

The present invention relates to a video system, and more particularly to a video system capable of being mounted in a headrest.

2. Discussion of Related Art

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens are connected to video players located, for example, in the glove box of the vehicle. However, the video player and video screen cannot be removed from the vehicle. Thus, videos may only be viewed with such systems when occupying the vehicle, and only from particular vantage points within the vehicle. Further, there is also a risk of theft of the video screen and video player and corresponding damage to the vehicle when the vehicle is unattended.

Therefore, a need exists for a video system capable of being mounted in a headrest.

SUMMARY OF THE INVENTION

According to an embodiment of the present invention, a video system comprises a base unit coupled to an internal headrest support structure, wherein the base unit comprises a media player, and a display mounted in a door pivotally connected to the base unit by a hinge and in a closed position concealing the media player.

The video system comprises a docking station disposed between the base unit and the internal headrest support structure, for selectively coupling the video system to the internal headrest support structure, wherein the video system can be selectively un-coupled from the base unit.

The video system is a clamshell-type device. The hinge is a swivel-hinge.

The video system further comprises a wireless transmitter. The video system comprises a port for connecting to an external device.

The video system comprises a power source coupled to the docking station, the docking station providing power to a coupled video system. The video system is coupled to an external device through the docking station, wherein the docking station and the video system are coupled by a pin array.

According to an embodiment of the present invention, a video system comprises a base unit coupled to an internal headrest support structure, and a door pivotally connected to the base unit by a hinge, the door comprising a display and a media player.

The video system comprises a docking station disposed between the base unit and the internal headrest support structure, for selectively coupling the video system to the internal headrest support structure, wherein the video system can be selectively un-coupled from the base unit.

The video system is a slot-type device.

The video system further comprises a wireless transmitter. The hinge is a swivel-hinge.

The video system comprises a port for connecting to an external device.

The video system comprises a power source coupled to the docking station, the docking station providing power to a coupled video system. The video system is coupled to an external device through the docking station, wherein the docking station and the video system are coupled by a pin array.

According to an embodiment of the present invention, a docking station adapted to secure a portable video system comprises a means for securing the docking station to an internal headrest support structure, a means for securing the portable video system to the docking station, and a pin array for providing power to a secured portable video system.

The pin array carries a signal between the secured removable video unit and an external device.

The signal is one of an audio signal and a video signal.

A cover is secured to the docking station in the absence of the portable video system.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a portable video system can be coupled to a vehicle headrest. The portable video system receives a data media comprising data to be displayed. The video system is secured to a docking station mounted in the headrest. The video system is removable, such that the video system can be disconnected from the docking station.

Figure 1:
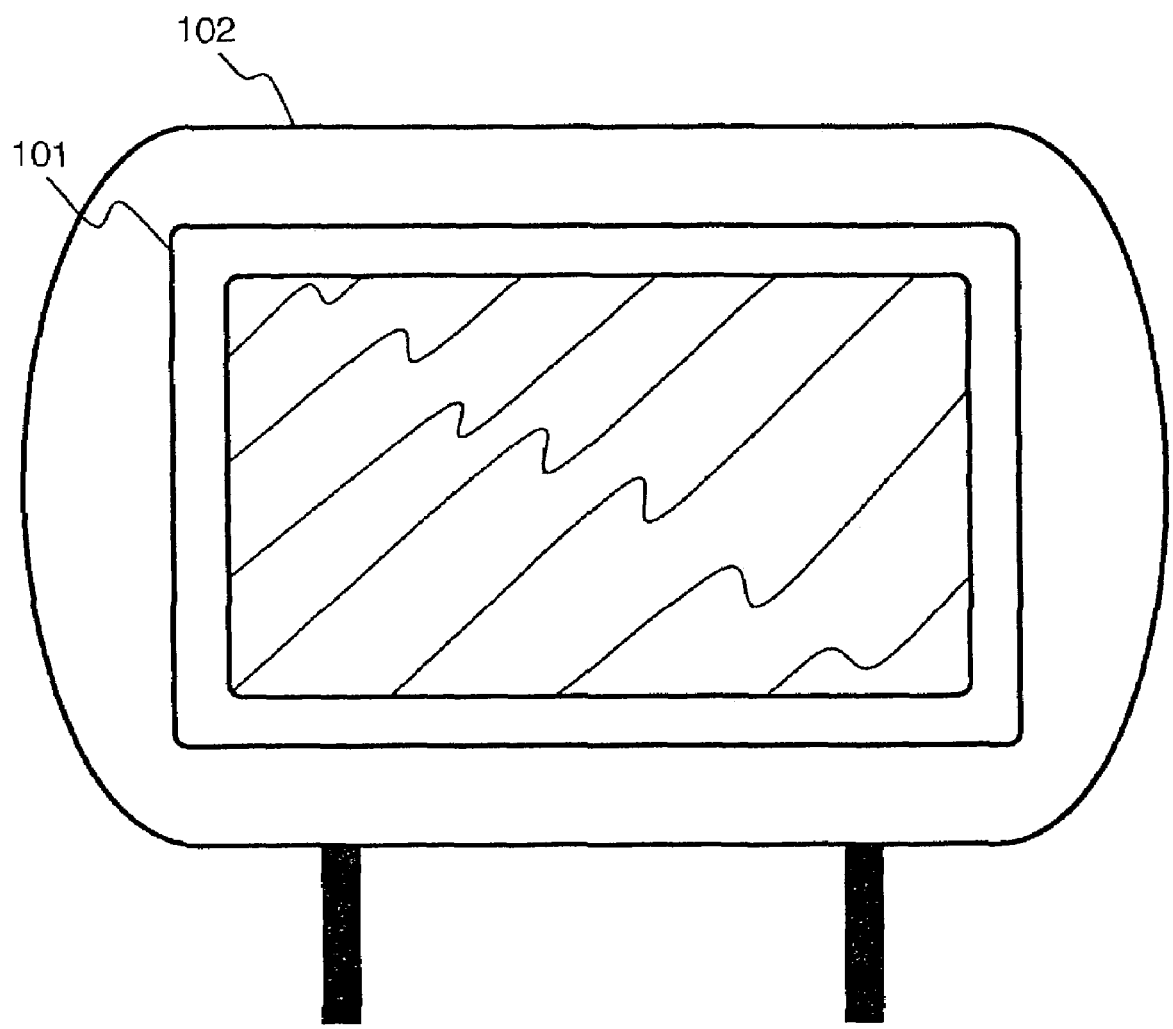
FIG. 1 is an illustration of a video screen installed in a vehicle headrest.
Figure 2:
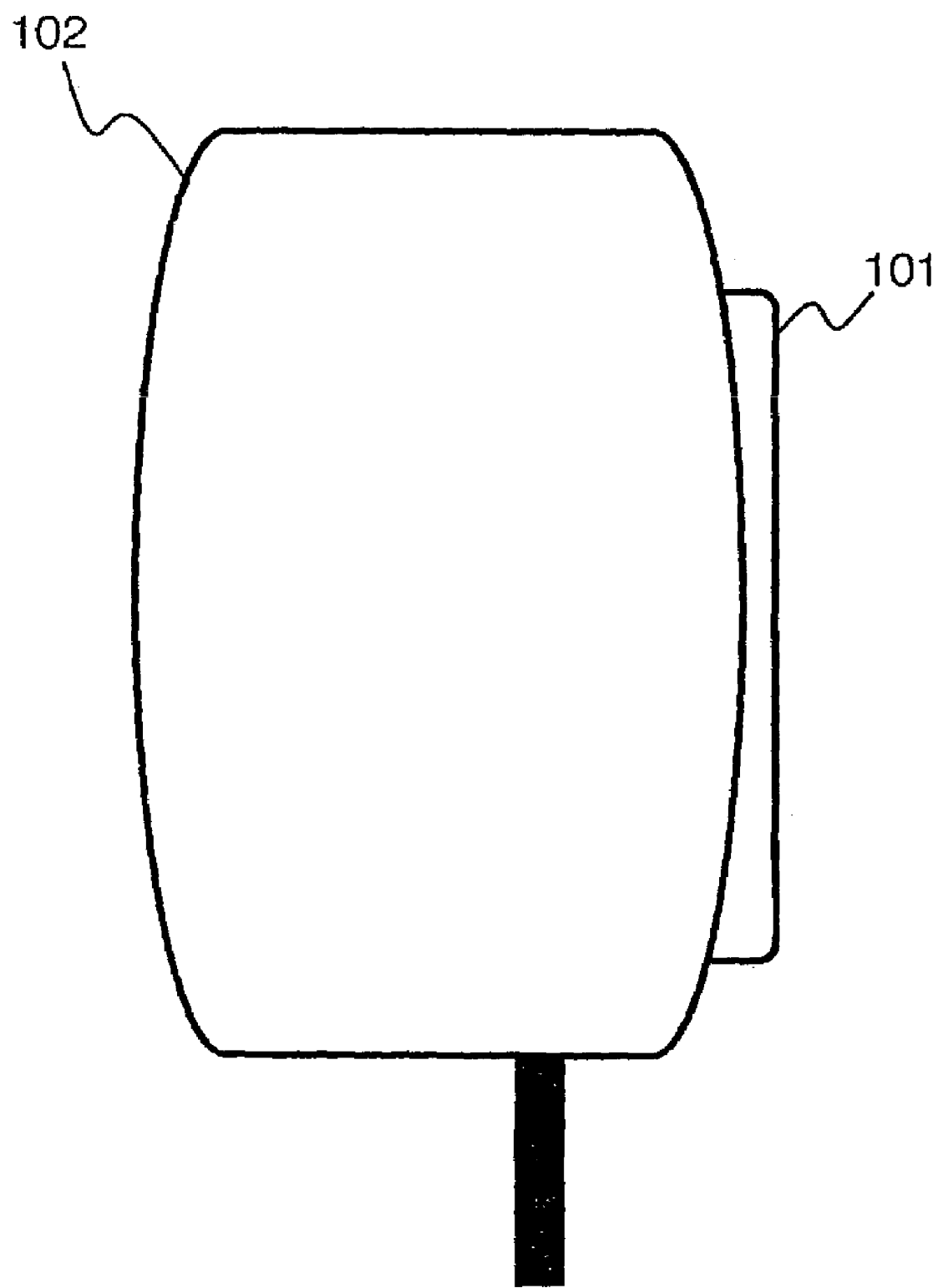
FIG. 2 is an illustration of a video screen installed in a vehicle headrest.
Figure 3A:
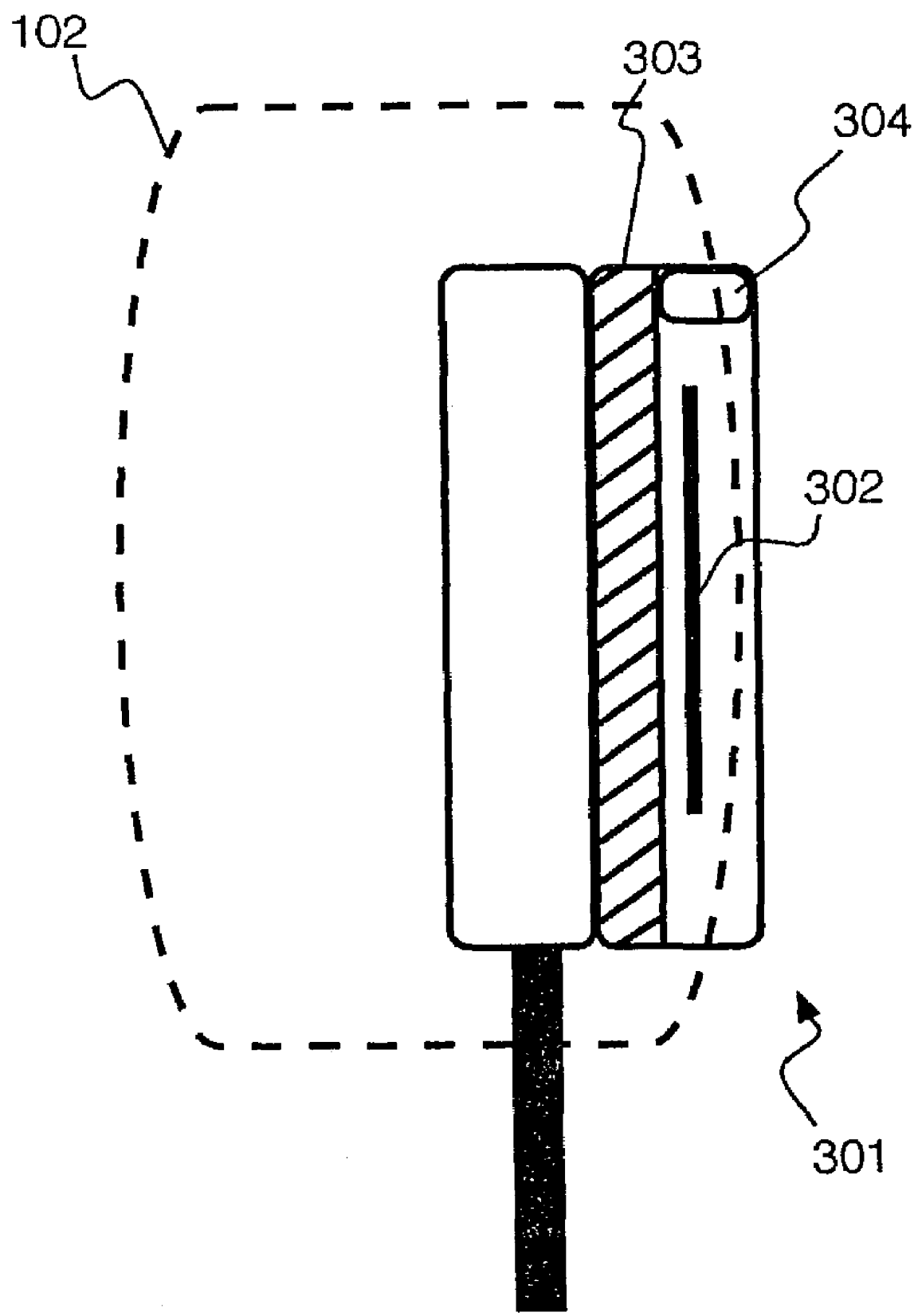
FIG. 3A is an illustration of a side view of a video system and docking station according to an embodiment of the present invention.

Referring to FIG. 3A, the portable video system can be embodied as a slot-type video system 301 comprising a slot 302 that receives a data media into a mechanism for accessing data stored on the medium, such as a digital videodisk (DVD) player, MPEG layer 3 (MP3) disk, or video game disk. The video system 301 is secured to a docking station 303. The video system 301 comprises a hinge 304. The hinge connects a video screen portion of the video system to a base portion of the video system.

Figure 3B:
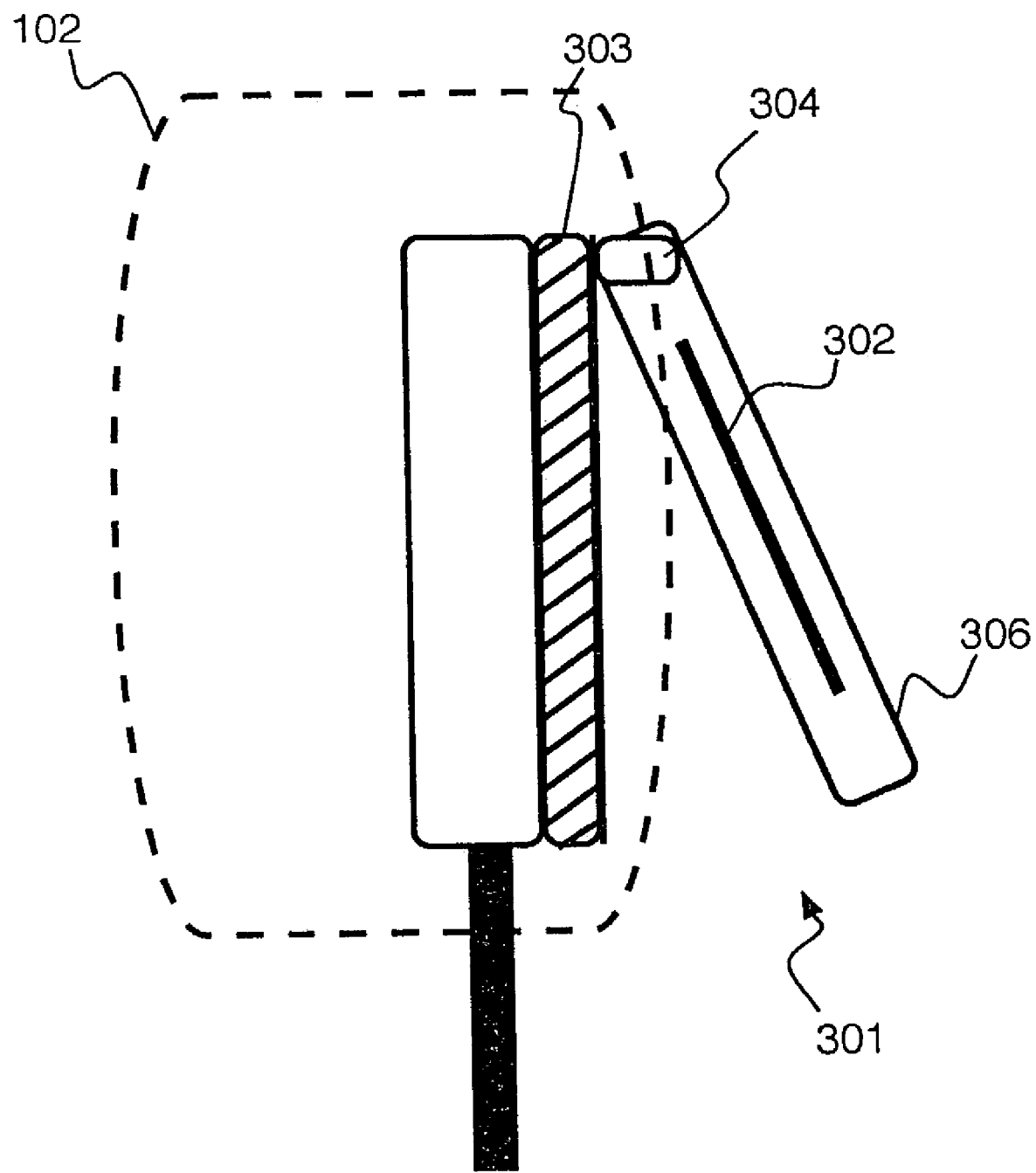
FIG. 3B is an illustration of a side view of a video system and docking station according to an embodiment of the present invention.
Figure 4A:
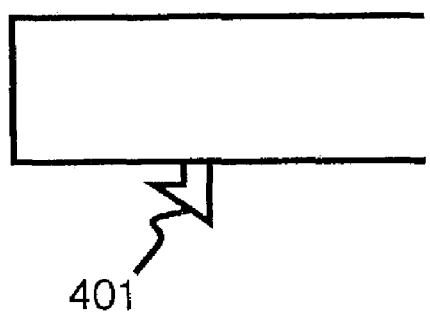
FIGS. 4A and 4B are illustrations of a docking station according to an embodiment of the present invention.
Figure 4B:
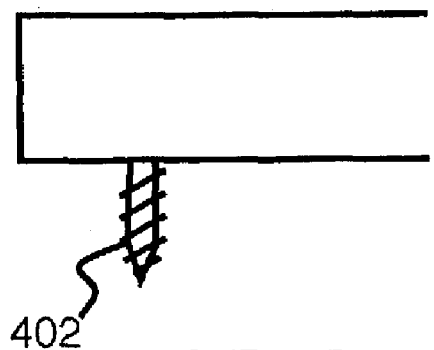
Figure 5A:
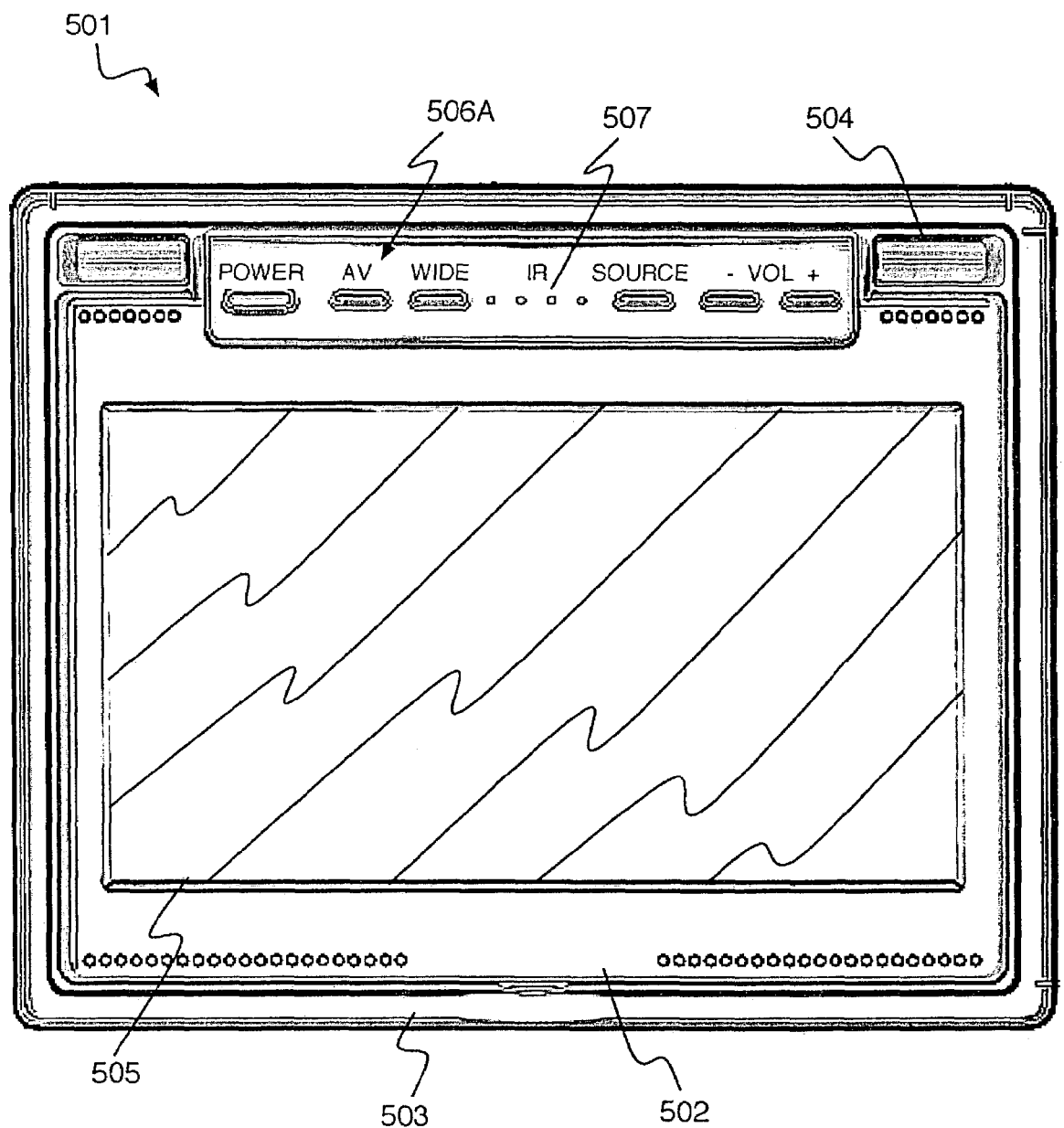
FIG. 5A is an illustration of a front view of a clamshell-type video system according to an embodiment of the present invention.
Figure 5B:
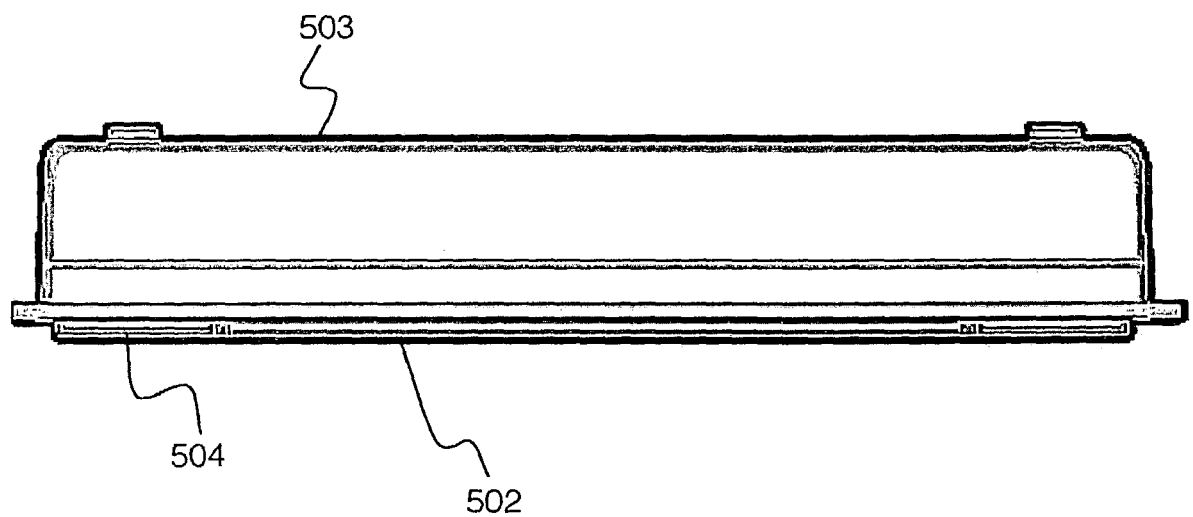
FIG. 5B is an illustration of a top view of a clamshell-type video system according to an embodiment of the present invention.
Figure 5C:
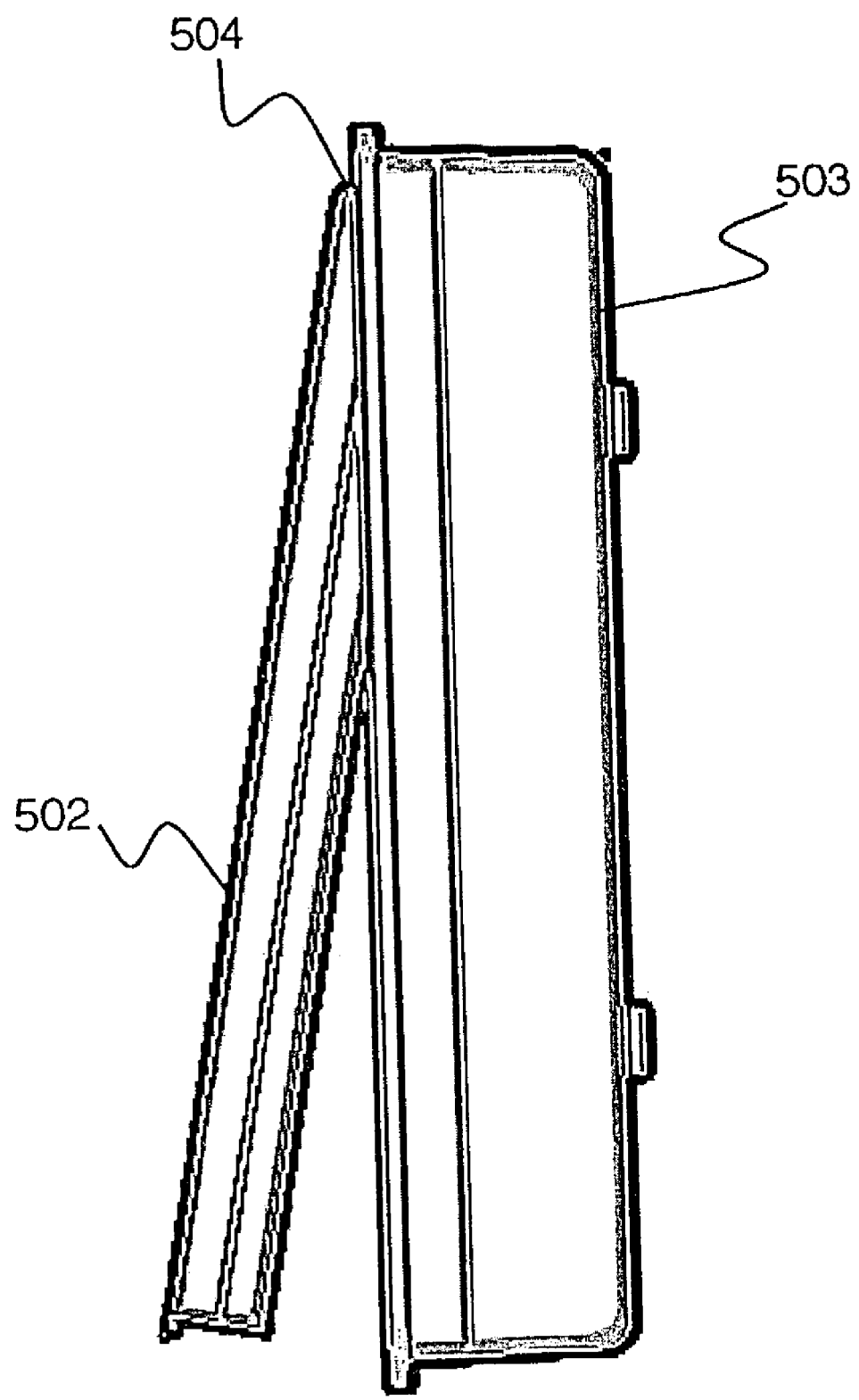
FIG. 5C is an illustration of a side view of a clamshell-type video system according to an embodiment of the present invention.
Figure 5D:
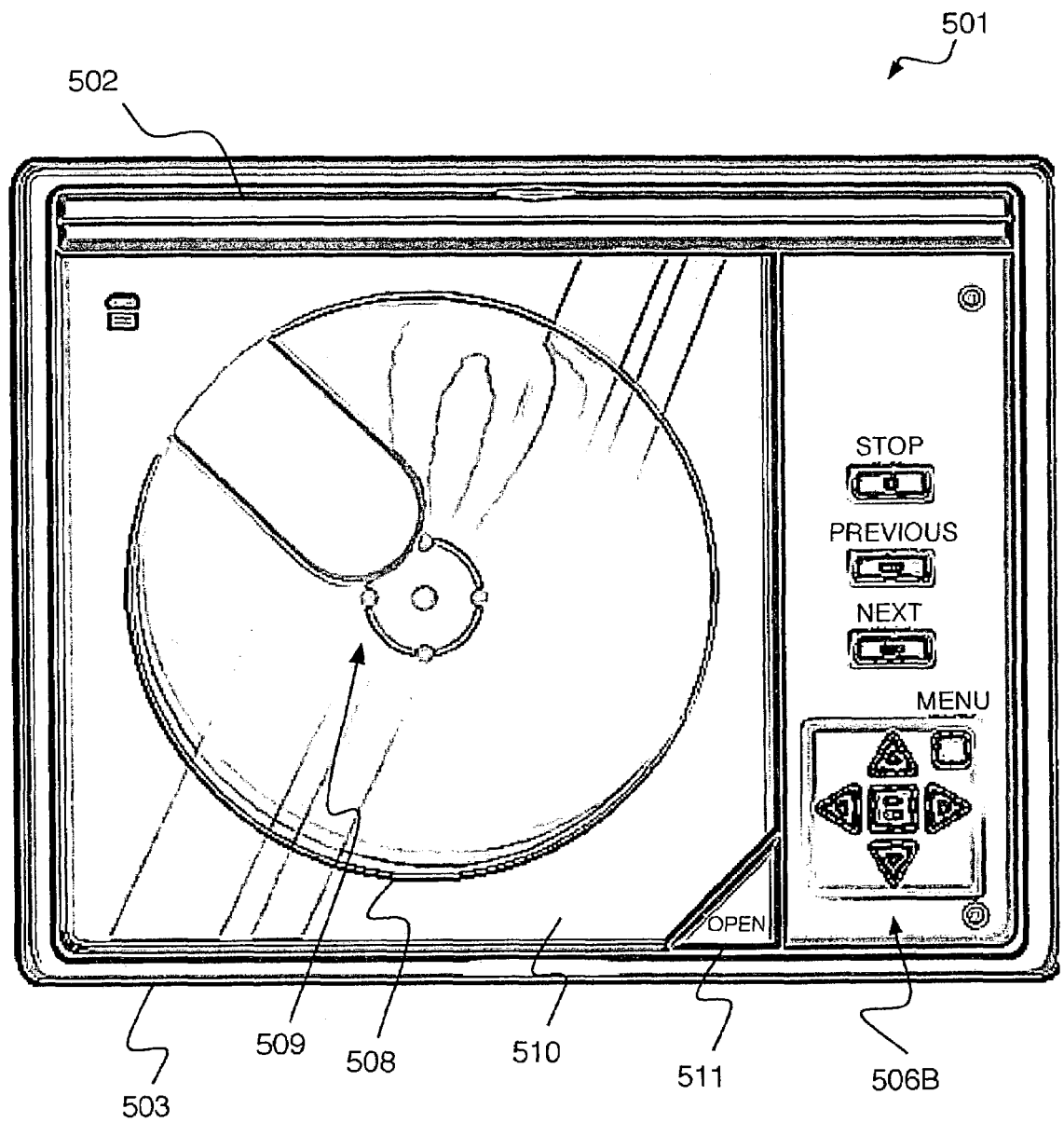
FIG. 5D is an illustration of a front view of a clamshell-type video system in an open position according to an embodiment of the present invention.

As shown in FIG. 3B, the docking station 303 is secured in the headrest 102, and more particularly to an internal headrest support structure 305. The docking station 303 can be secured by, for example, a catch 401 as shown in FIG. 4A and/or a screw 402 as shown in FIG. 4B. One of ordinary skill in the art would recognize that other means of securing the docking station can be used, for example, an adhesive compound. The docking station 303 secures a base portion of the video system 301, and allows a video screen portion 306 to pivot away from the base portion. In a slot-type device, as shown in FIG. 3B, the slot 302 is exposed for receiving a data media when the video screen portion 306 is in a pivoted position away from the base portion of the video system 301.

Figure 3C:
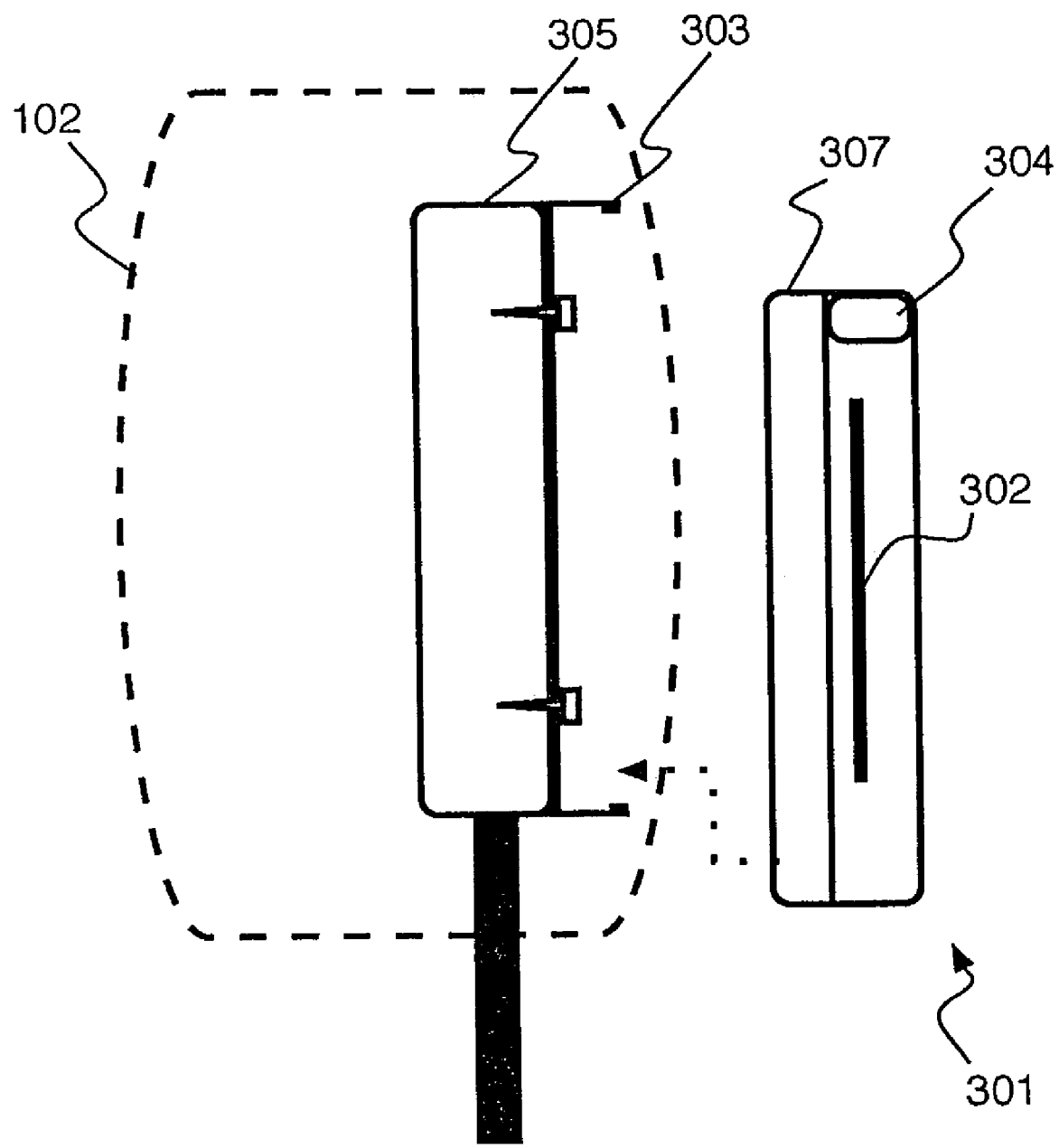
FIG. 3C is an illustration of a side view of an undocking stationed video system according to an embodiment of the present invention.

As shown in FIG. 3C, the video system 301 can be disconnected from the docking station 303 (cut away view). The video system 301 can be operated autonomously. That is, when decoupled from the docking station 303, the video system 301 can access a data media to play, for example, a movie. When disconnected from the docking station, the video system can operate on power supplied by an optional battery or a connection to an external power supply, such as an AC or DC current. The connection can be to the base portion 307 of the video system 301.

Figure 3D:
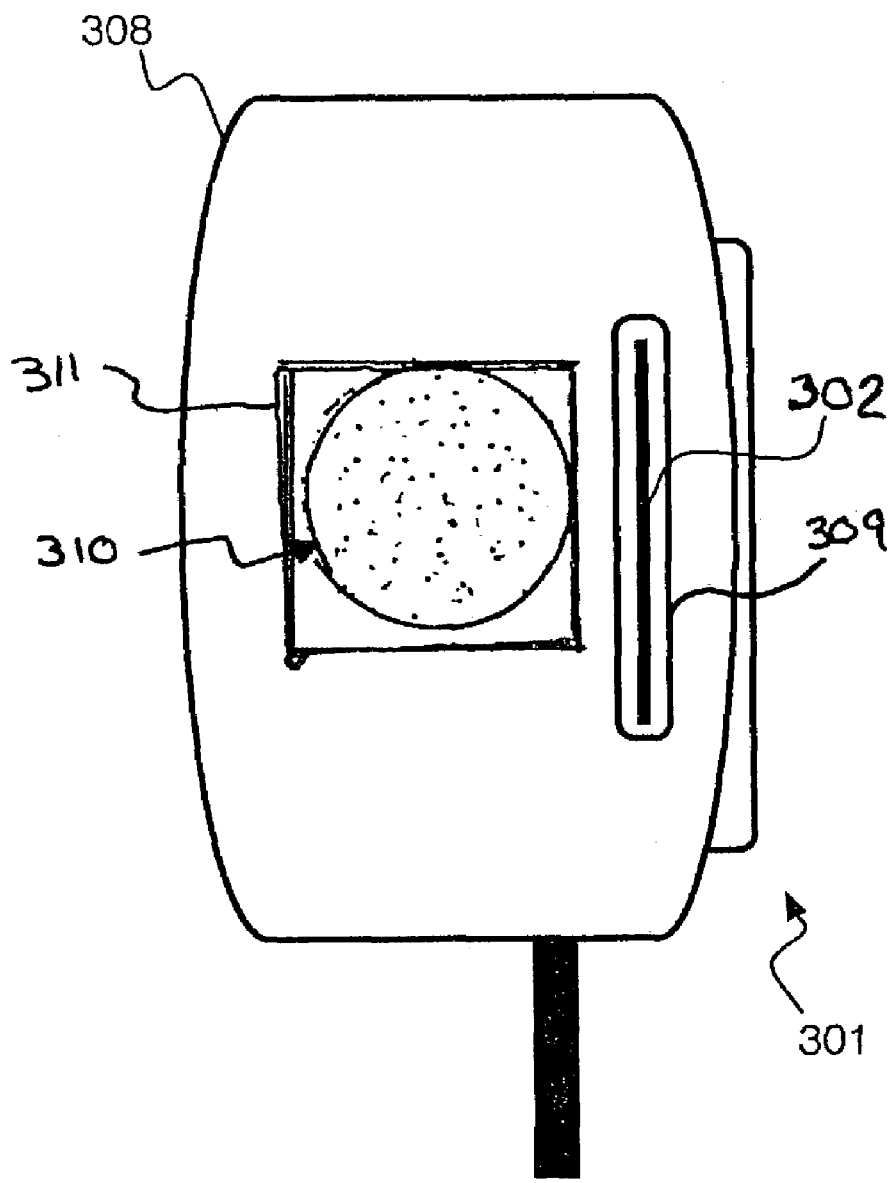
FIG. 3D is an illustration of a side view of a video system according to an embodiment of the present invention

Referring to FIG. 3D, a headrest 308 can comprise an opening 309 for receiving a data media into the video system 301. The video system 301 can be a permanently installed or portable video system. The headrest opening 309 aligns with the slot 302 of the video system 301 to allow data media, such as a DVD or MP3 disk to be inserted from the side, top, or bottom of the headrest 308. The headrest 308 further comprises vents 310 for dissipating heat. A cooling fan 311 for increasing airflow can also be added within the headrest. The cooling fan 311 can be located in the headrest 308 and behind the vent 310, such that the cooling fan 311 is concealed.

Referring to FIGS. 5A through 5D, a portable video system 501 of a clamshell-type is secured to a docking station. The portable video system 501 comprises a door 502 and a base portion 503 connected by a hinge 504. The door 502 pivots away from the base portion 503 on the hinge 504. The hinge 504 can be positioned on any side of the door 502. The door 502 comprises a video screen 505, controls 506A, and an infrared (IR) transmitter and/or receiver 507. The video system 501 receives a data media 508 comprising data to be accessed. When the door 502 is closed the data media 505 is secured. The door 502 can be opened by, for example, depressing a button releasing the door 503 from the base portion 503 or pulling the door 502 away from the base 503 wherein the hinge 504 is a friction fitting. A media player 509 is concealed by cover 510. The cover 510 can be opened by, for example, depressing a button 511. The video system 501 is removable, such that the video system can be disconnected from the docking station 303.

The base 503 comprises a control panel 506B. The control panel 506B comprises a plurality of controls for controlling the functions of the media player, for example, volume control, previous, next, pause, eject and play, and a power on/off button. The controls 506A and 506B can be, for example, buttons, switches, a touch sensitive liquid crystal display, and the like.

Figure 6A:
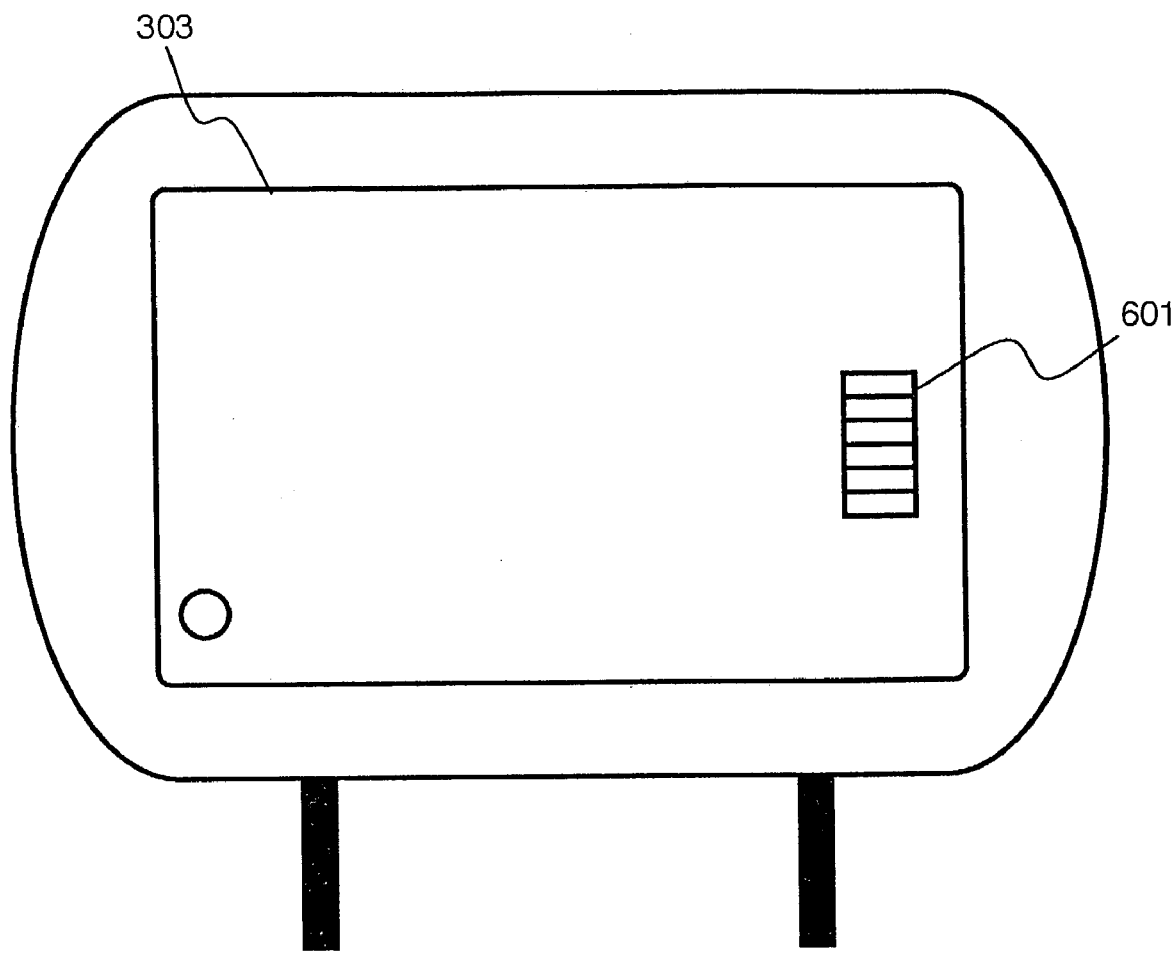
FIG. 6A is an illustration of a docking station according to an embodiment of the present invention.
Figure 6B:
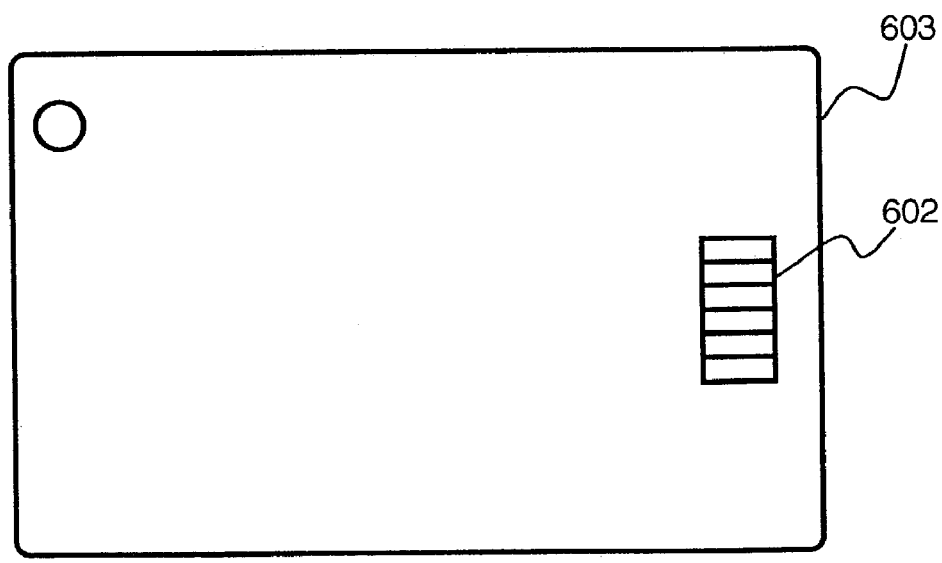
FIG. 6B is an illustration of a rear view of a video system according to an embodiment of the present invention.

Referring now to FIGS. 6A and 6B, the docking station 303 comprises a pin array 601 for connecting to a pin array 602 of a video system 603. The video system 603 can be a slot-type device, a clamshell-type device, or any other device that is capable of being secured in the docking station 303. When the video system 603 is secured to the docking station 303, the pin array 601 and video system pin array 602 transfer data to and from the video player 603. Thus, the video player can be connected to external devices through the docking station 303. The external devices include, for example, a slave video display unit installed in another headrest, a security system, and a vehicle sound system. Where the video system 603 is permanently installed in the headrest, the docking station can be omitted, and a connection to the vehicle's power supply and/or data bus can be directly coupled to the video system 603 through, for example, an electrical harness.

The docking station 303 is coupled to a vehicle's electrical system. The docking station 303 is connected to a vehicle's power supply, e.g., 12 Volts, through a wiring harness. Power can be supplied to the video system 603 through the pin arrays 601 and 602. The docking station 303 can be connected to a vehicle's data communication bus. The data communications bus can carry data to and from the external devices.

Figure 7A:
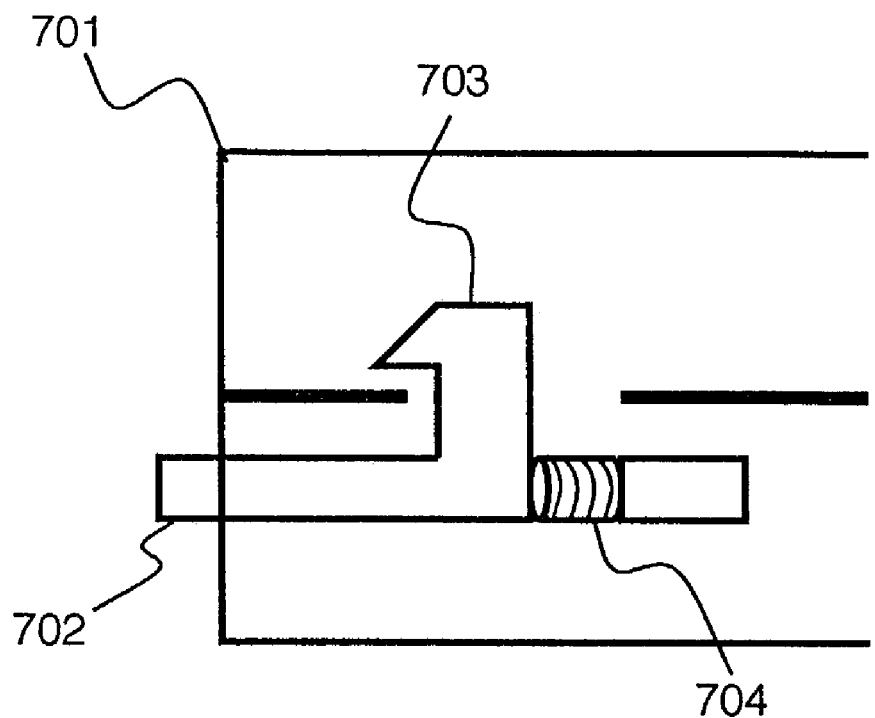
FIGS. 7A and 7B are illustrations of mechanisms for coupling a video system and a docking station according to an embodiment of the present invention.
Figure 7B:
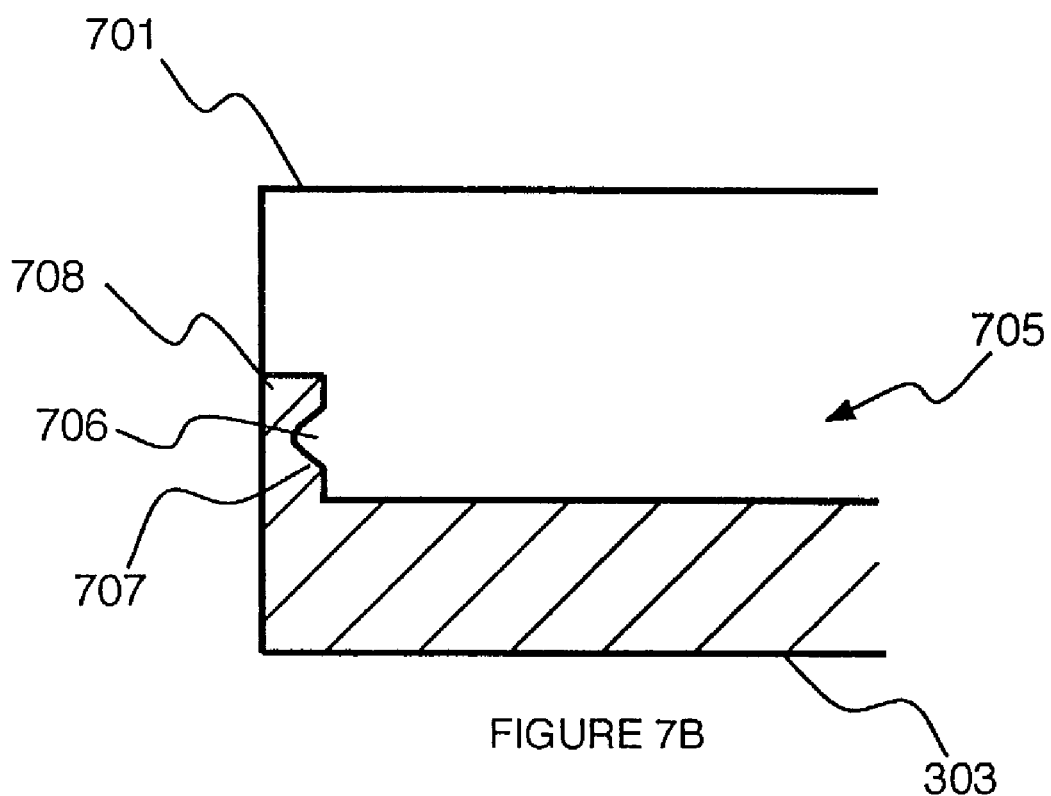

Referring to FIG. 7A, the docking station 303 comprises a quick release mechanism for securing and releasing the video system 701. The quick release mechanism can include a button 702 for releasing a latch 703, which is secured to the video system 701 by pressing the video system 701 securely into the docking station 303. A latch mechanism comprises a latch 703 that passes into a bottom portion of the video system 701. The latch 703 is momentarily displaced as the video system 701 is coupled with the docking station 303. A spring 704 secures the latch 703 in the bottom portion of the video system 701. The button 702 can be pressed, aligning the latch 703 with an opening in the bottom portion of the video system 701, and the video system 701 can be pulled away from the docking station 303. As shown in FIG. 7B, a rear portion 705 of the video system 701 can be secured by a convex portion 706 that fits within a concave portion 707 in the docking station 303. As the video system 701 is pressed into the docking station 303, a wall of the docking station 708 flexes away from the rear portion of the video player until the convex portion 706 is aligned with the concave portion 707. The convex portion 706 and the concave portion 707 cooperate to secure the video system 701 to the docking station 303. Thus, a wall of the docking station 708 can be formed of, for example, a flexible thermoplastic rubber. Other means of securing the video system 701 to the docking station 303 are contemplated, such as, snaps, locks, latches, and the like.

Figure 8:
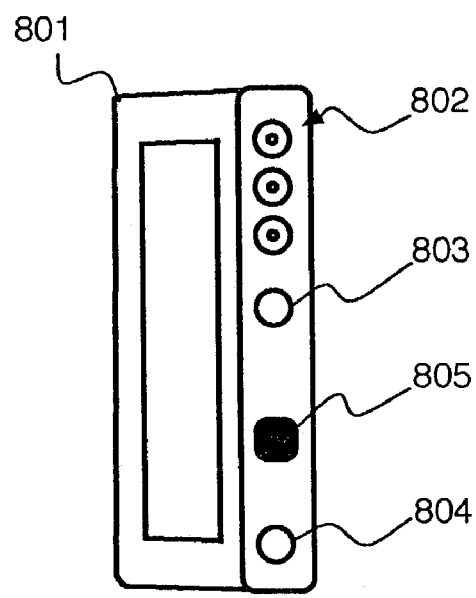
FIG. 8 is an illustration of a video system according to an embodiment of the present invention.

Referring to FIG. 8, the video system 801 comprises input and output ports. For example, audio/video input/output ports 802, a headphone port 803, and a power port 804. It should be understood that other port types can be provided, for example, a USB port or RCA jack for connecting to a game controller. Further, the video system 801 comprises a wireless transmitter for transmitting, for example, an audio radio frequency, Bluetooth®, or Whitefire® signal to wireless headphones. The video system 801 further comprises an infrared (IR) port 805 for transmitting and/or receiving, for example, remote control signals. The ports can be positioned at any convenient location on the video system 801, for example, on a bottom portion of the base of the video system, a front portion of the base of the video system, or a side portion.

Figure 9:
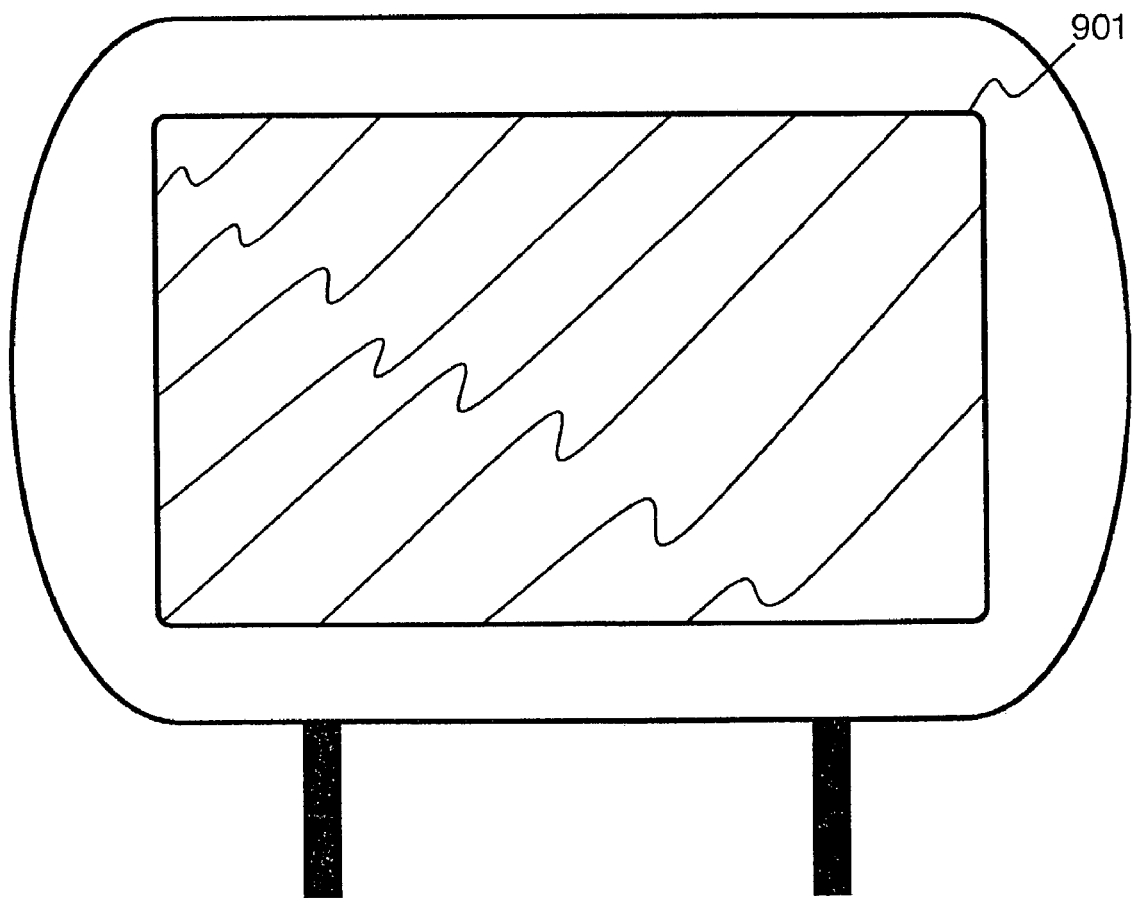
FIG. 9 is an illustration of a docking station cover according to an embodiment of the present invention.

When the video system is removed from the docking station 303, a cover 901 can conceal a portion of the docking station, as shown in FIG. 9. The cover 901 is manufactured from a material such as, plastic, wood, leather, and/or aluminum. The cover 901 can be secured by the same mechanisms as the video system, such as those shown in FIGS. 7A and 7B. Thus, the cover 901 and the video player can have one or more features in common, such as openings for receiving latches and the like.

It is to be appreciated that a portable video system according to the present invention is easily removable from and can be operated outside of a vehicle, for example, in home or office environments. Further, the video system can be permanently connected to the headrest support structure by, for example, screws, catches, and adhesives.

Figure 10:
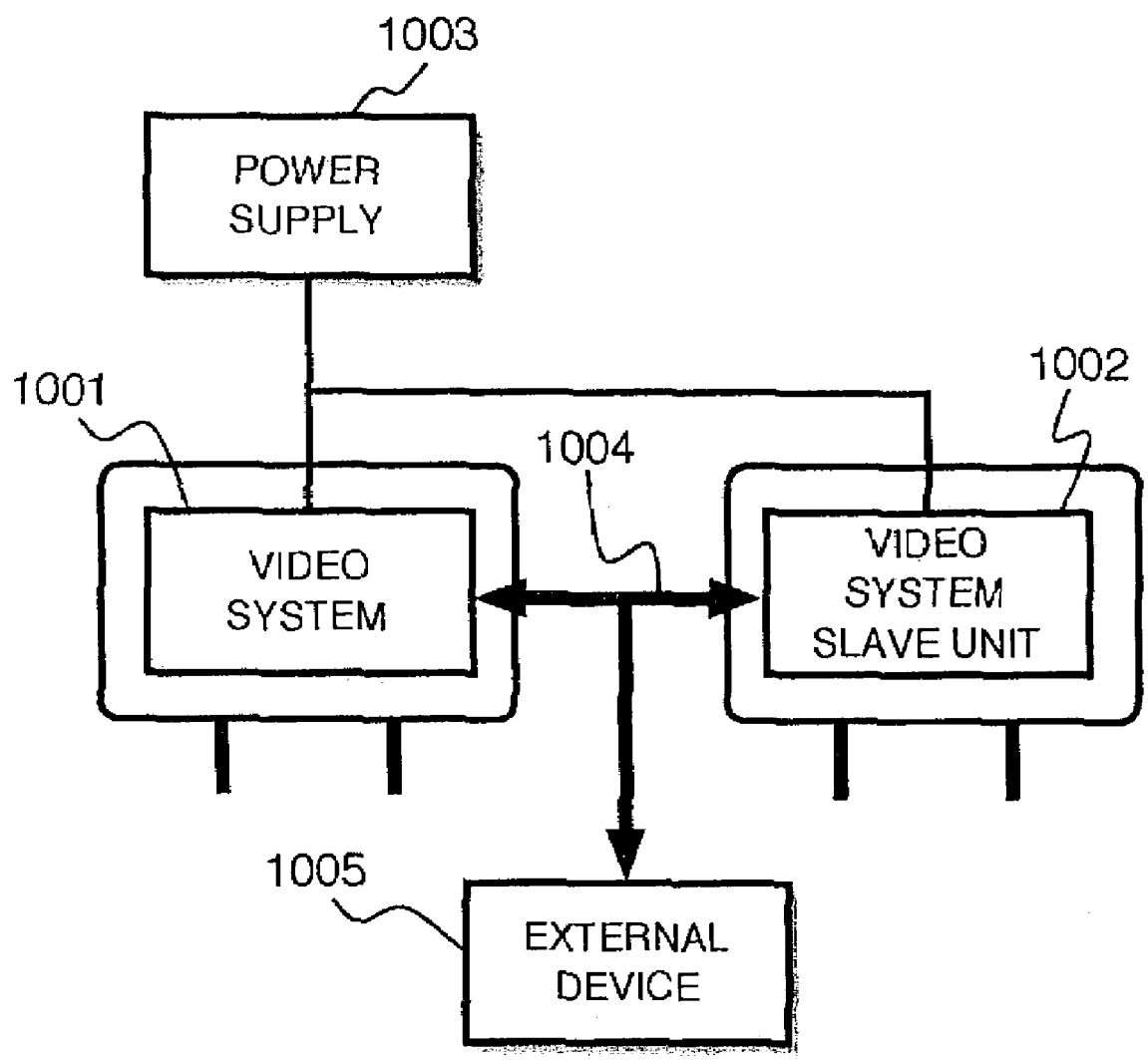
FIG. 10 is a diagram of a system according to an embodiment of the present invention.

Referring now to FIG. 10, a video system 1001 and a video slave unit 1002 are connected to a power supply 1003. The video slave unit receives data to be displayed from the video system 1001 through a data bus 1004. The data bus 1004 can be connected to other devices 1005, such as a vehicle's sound system or a vehicle's navigation system. The connections between the video system 1001 and the external device 1005 can be a wireless connection (not shown). Similarly, the connection between the video system 1001 and the video system slave device 1002 can be a wireless connection (not shown).

Figure 11A:
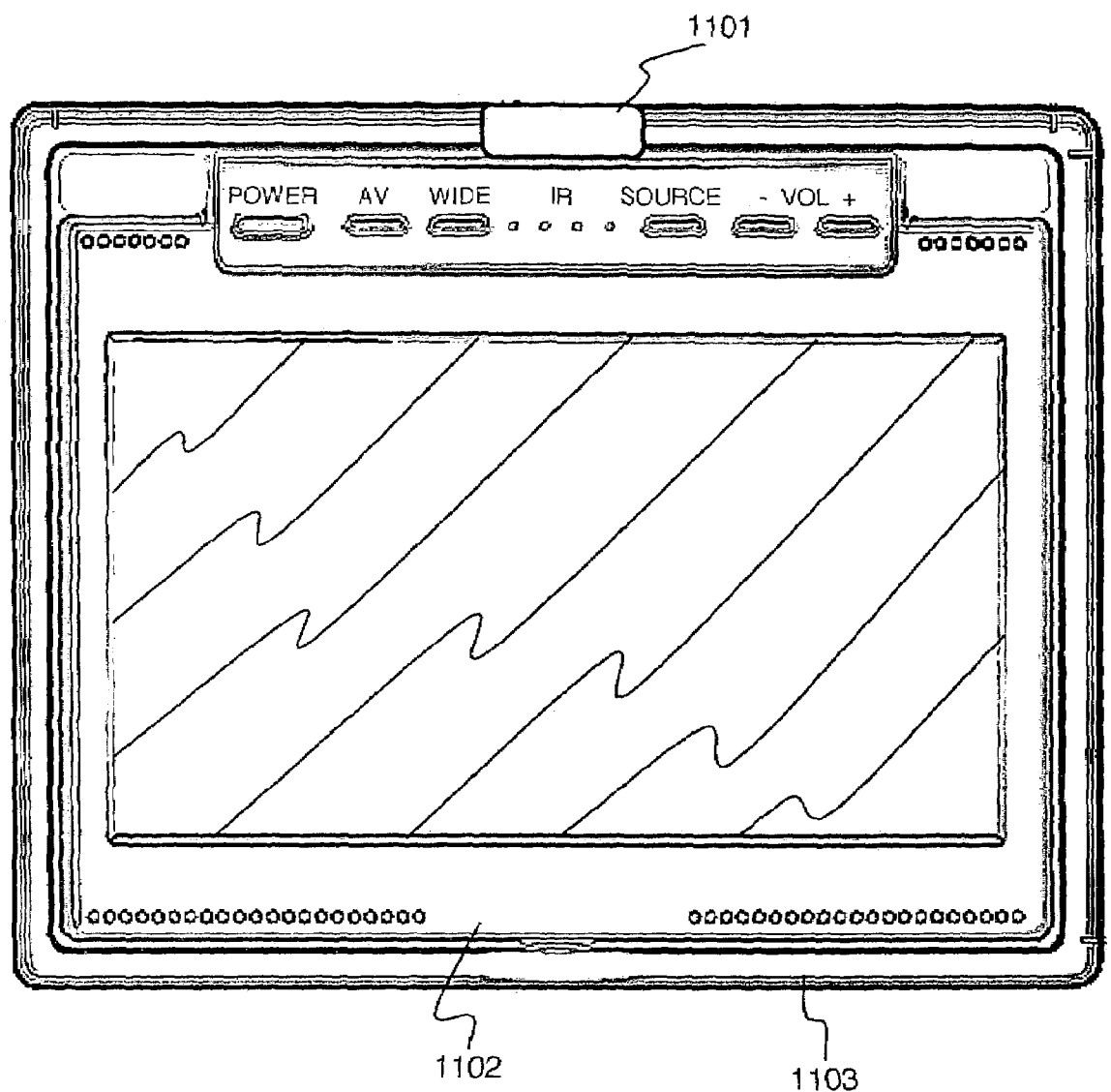
FIGS. 11A and 11B are illustrations of a video system according to an embodiment of the present invention.
Figure 11B:
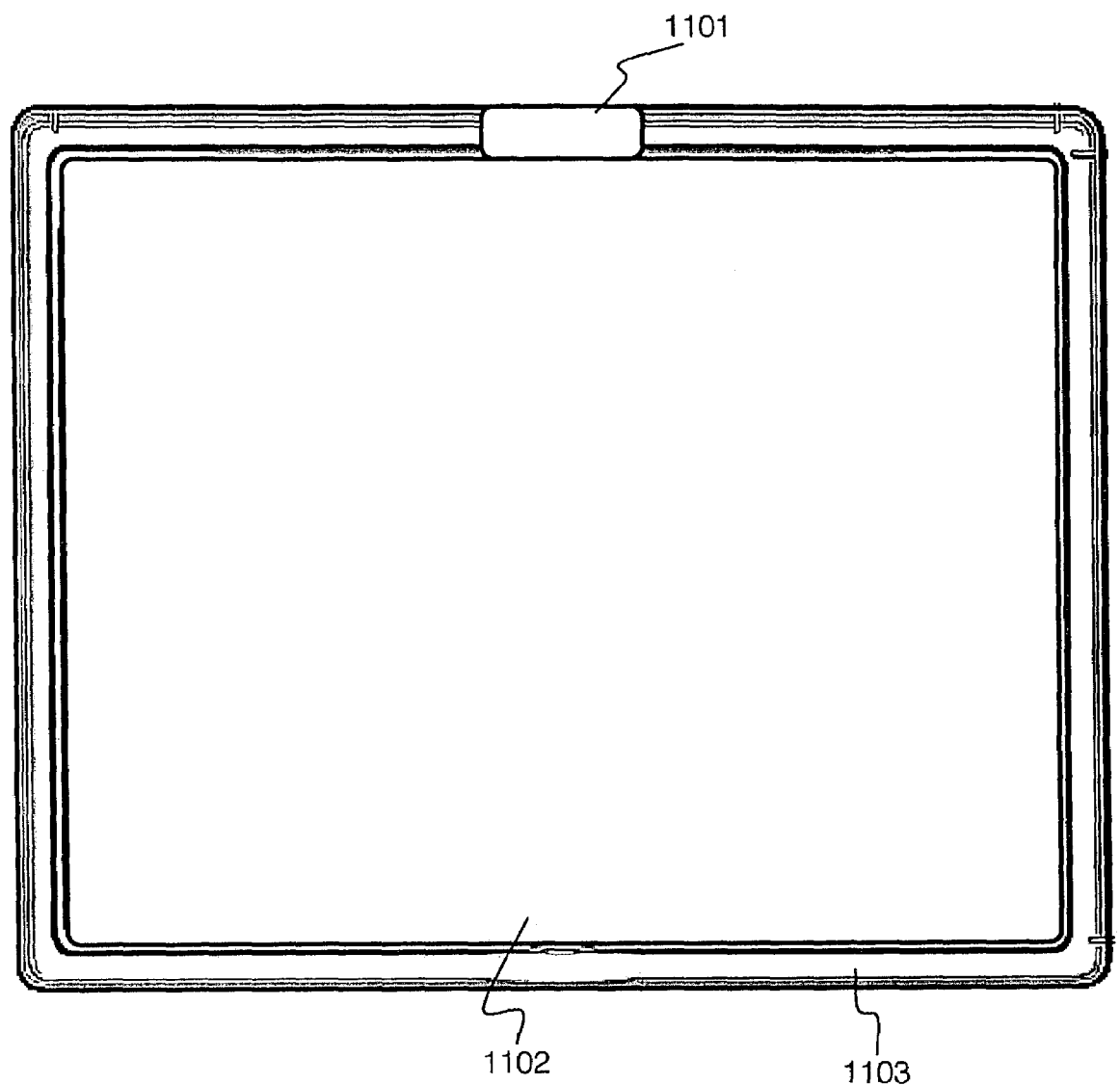

While the video system has been described in terms of a clamshell-type device and a slot-type device, the video system can be embodied in other configurations, for example, as a draw-type device comprising a draw and a spindle for securing the data media in place. Another example of a video system according to an embodiment of the present invention is a tablet-type device comprising a swivel-hinge connecting a video screen to a base portion as shown in FIGS. 11A and 11B. The swivel-hinge 1101 allows a door 1102 comprising a screen to move about two axes such that the screen 1102 can be swiveled about the swivel-hinge 1001 while in an open position, pivoted away from the base 1103. The screen can be turned to face the base portion 1103 when in a fully closed position (e.g., FIG. 11B) or turned to face away from the base portion 1103 in a closed viewing position (e.g., 11A). In both the fully closed position and the closed viewing position, the door 1102 is substantially parallel to the base portion 1103. The swivel-hinge 1101 can be implemented in a slot-type device or a clamshell-type device.

Having described embodiments for headrest mountable a video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A video system comprising:
 a base unit coupled to an internal headrest support structure; and
 a door pivotally connected to the base unit by a hinge, the door comprising a display and a media player comprising at least one of a DVD player, an MPEG player or a video game player.

2. The video system of claim 1, further comprising a docking station disposed between the base unit and the internal headrest support structure, for selectively coupling the video system to the internal headrest support structure, wherein the video system can be selectively un-coupled from the base unit.

3. The video system of claim 2, further comprising a power source coupled to the docking station, the docking station providing power to a coupled video system.

4. The video system of claim 2, wherein the video system is coupled to an external device through the docking station, wherein the docking station and the video system are coupled by a pin array.

5. The video system of claim 1, wherein the video system is a slot-type device.

6. The video system of claim 5, wherein a slot for receiving a date media is positioned on a side of the door.

7. The video system of claim 1, further comprising a wireless transmitter.

8. The video system of claim 1, wherein the hinge is a swivel-hinge.

9. The video system of claim 1, further comprising a port for connecting to an external device.

10. A video system comprising:
 a display mounted to a headrest of a vehicle seat, wherein the display is pivotally coupled to a headrest support element, the headrest support element being disposed inside and outside of the headrest.

11. A video system comprising:
 a base portion positioned in a headrest of a vehicle seat, wherein the base portion accommodates a media player comprising at least one of a DVD player, an MPEG player or a video game player and a display pivotally connected to the base portion.

12. A docking station adapted to secure a portable video system including a media player comprising it least one of a DVD player, an MPEG player or a video game player, the docking station comprising:
 a means for securing the docking station to a headrest support structure located within a headrest of a vehicle seat, wherein at least a portion of the docking station is disposed within the headrest;
 a means for securing the portable video system to the docking station; and
 a pin array for providing power to a secured portable video system.

13. The docking station of claim 12, wherein the pin army carries a signal between the secured removable video unit and an external device.

14. The docking station of claim 13, wherein the signal is one of an audio signal and a video signal.

15. The base unit of claim 12, wherein a cover is secured to the docking station in the absence of the portable video system.

16. A video system comprising:
a base unit coupled to a headrest support structure located within a headrest of a vehicle seat, wherein the base unit comprises a media player comprising at least one of a DVD player, an MPEG player or a video game player; and
a display mounted in a door pivotally connected to the base unit by a hinge and in a closed position concealing the media player.

17. The video system of claim 16, further comprising a docking station disposed between the base unit and the headrest support structure, for selectively coupling the video system to the headrest support structure, wherein:
the video system can be selectively un-coupled from the base unit; and
at least a portion of the docking station is disposed within the headrest and is directly coupled to the headrest support structure.

18. The video system of claim 17, further comprising a power source coupled to the docking station, the docking station providing power to a coupled video system.

19. The video system of claim 17, wherein the video system is coupled to an external device through the docking station, wherein the docking station and the video system are coupled by a pin array.

20. The video system of claim 16, wherein the video system is a clamshell-type device.

21. The video system of claim 16, wherein the hinge is a swivel-hinge.

22. The video system of claim 16, further comprising a wireless transmitter positioned on the door.

23. The video system of claim 16, further comprising a port for connecting to an external device.

* * * * *